United States Patent
Haas et al.

(10) Patent No.: US 9,378,894 B2
(45) Date of Patent: Jun. 28, 2016

(54) METHOD FOR PRODUCING ELECTROLYTIC CAPACITORS FROM VALVE METAL POWDERS

(75) Inventors: Helmut Haas, Achim (DE); Marcel Hagymasi, Goslar (DE); Holger Brumm, Goslar (DE); Christoph Schnitter, Holle (DE)

(73) Assignee: H.C. STARCK GMBH, Goslar (DE)

( * ) Notice: Subject to any disclaimer, the term of this patent is extended or adjusted under 35 U.S.C. 154(b) by 238 days.

(21) Appl. No.: 14/237,562

(22) PCT Filed: Aug. 8, 2012

(86) PCT No.: PCT/EP2012/065518
§ 371 (c)(1),
(2), (4) Date: Feb. 7, 2014

(87) PCT Pub. No.: WO2013/021004
PCT Pub. Date: Feb. 14, 2013

(65) Prior Publication Data
US 2014/0185190 A1   Jul. 3, 2014

Related U.S. Application Data

(60) Provisional application No. 61/522,407, filed on Aug. 11, 2011.

(30) Foreign Application Priority Data

Aug. 9, 2011  (DE) .......................... 10 2011 109 756

(51) Int. Cl.
| | | |
|---|---|---|
| H01G 9/00 | (2006.01) | |
| B22F 3/24 | (2006.01) | |
| B22F 7/00 | (2006.01) | |
| H01G 9/052 | (2006.01) | |
| H01G 9/15 | (2006.01) | |
| B22F 3/10 | (2006.01) | |
| B22F 3/11 | (2006.01) | |
| B22F 3/12 | (2006.01) | |

(52) U.S. Cl.
CPC ................ H01G 9/0029 (2013.01); B22F 3/10 (2013.01); B22F 3/1146 (2013.01); B22F 3/12 (2013.01); B22F 3/24 (2013.01); B22F 7/004 (2013.01); H01G 9/0032 (2013.01); H01G 9/052 (2013.01); H01G 9/0525 (2013.01); H01G 9/15 (2013.01); Y10T 29/49204 (2015.01)

(58) Field of Classification Search
CPC ........... H01G 9/008; H01G 9/04; H01G 9/14; H01G 9/00; H01G 9/28; H01G 9/0029; H01G 9/0032; H01G 9/004; H01G 9/012; H01G 9/10; H01G 11/42; H01G 9/052; H01G 13/00; H01G 9/0525; H01G 11/30
See application file for complete search history.

(56) References Cited

U.S. PATENT DOCUMENTS

| | | |
|---|---|---|
| 3,268,328 A | 8/1966 | Torti, Jr. |
| 3,378,471 A | 4/1968 | Vermilyea |
| 3,497,402 A | 2/1970 | Douglass et al. |
| 4,235,629 A | 11/1980 | Marsh et al. |
| 5,470,525 A | 11/1995 | Tripp et al. |
| 7,594,937 B2 | 9/2009 | Amita et al. |
| 2008/0106852 A1 | 5/2008 | Amita et al. |
| 2008/0267809 A1 | 10/2008 | Aimone et al. |
| 2011/0128676 A1 | 6/2011 | Karabulut et al. |

FOREIGN PATENT DOCUMENTS

| | | |
|---|---|---|
| DE | 1 496 811 A1 | 7/1969 |
| DE | 1 614 902 B1 | 12/1970 |
| DE | 10 2008 026 304 A1 | 12/2009 |
| JP | 9-246109 A | 9/1997 |
| JP | 11-288851 A | 10/1999 |
| JP | 2002-64034 A | 2/2002 |
| JP | 2006-179886 A | 7/2006 |
| JP | 2008-72003 A | 3/2008 |
| JP | 2009-64960 A | 3/2009 |
| JP | 2009-105171 A | 5/2009 |
| JP | 2010-192502 A | 9/2010 |
| WO | WO 2008/134439 A1 | 11/2008 |

OTHER PUBLICATIONS

EIAJ RC-2361 A: "Test methods of tantalum sintered anodes for electrolytic capacitors", Standard of Electronic Industries Association of Japan, pp. 1-25 (2000).
ASTM D 3663-03: "Standard Test Method for Surface Area of Catalysts and Catalyst Carriers", ASTM International, pp. 1-5 (Oct. 2003).
ASTM B 329-06: "Standard Test Method for Apparent Density of Metal Powders and Compounds Using the Scott Volumeter", ASTM International, pp. 1-3 (Dec. 2006).

*Primary Examiner* — Dion R Ferguson
(74) *Attorney, Agent, or Firm* — Norman B. Thot

(57) ABSTRACT

A process for producing an anode for an electrolytic capacitor includes pressing a tantalum powder around a tantalum wire, a tantalum ribbon, or a tantalum sheet to form a pressed body. The pressed body is sintered to form a porous sintered body. The porous sintered body is cooled to form a cooled porous sintered body. The cooled porous sintered body is treated with at least one oxidant comprising at least one of a gaseous oxidant and a liquid oxidant to form a treated sintered body. The treated sintered body is anodically oxidized in an electrolyte to form a dielectric layer.

27 Claims, No Drawings

METHOD FOR PRODUCING ELECTROLYTIC CAPACITORS FROM VALVE METAL POWDERS

CROSS REFERENCE TO PRIOR APPLICATIONS

This application is a U.S. National Phase application under 35 U.S.C. §371 of International Application No. PCT/EP2012/065518, filed on Aug. 8, 2012 and which claims benefit to German Patent Application No. 10 2011 109 756.6, filed on Aug. 9, 2011, and to U.S. Provisional Patent Application No. 61/522,407, filed on Aug. 11, 2011. The International Application was published in German on Feb. 14, 2013 as WO 2013/021004 A1 under PCT Article 21(2).

FIELD

The present invention relates to a process for producing sintered tantalum bodies and tantalum anodes for tantalum electrolytic capacitors having stable wire bending strength, sintered tantalum bodies and anodes produced by this process, and the use of such tantalum anodes for producing tantalum electrolytic capacitors.

BACKGROUND

The relevant literature describes the earth-acid metal (acidic earth metal) tantalum as a starting material for the production of electrolytic capacitors. To produce anodes for such capacitors, tantalum powders are pressed around a semifinished tantalum part, usually a wire or ribbon (band/strip) or a metal sheet, and sintered at high temperatures of typically 1000° C. to 2000° C. in a high vacuum to give a porous sintered body having about 30% to 50% of the theoretical density of tantalum and a high internal surface area. An insulation layer, known as the dielectric, is subsequently produced on the internal surface area of the porous sintered body by anodic oxidation in a usually aqueous electrolyte, e.g., a dilute phosphoric acid, usually at temperatures in the range 50° C. to 90° C. The counterelectrode (cathode) is subsequently applied in the form of a layer of manganese dioxide or a conductive polymer, such as polypyrrole or polythiophene, on the tantalum anode produced in this way. After application of a graphite layer and contacting of the cathode by means of a conductive silver layer, the capacitor is finally embedded in epoxy resin.

A heat treatment (tempering) at 200° C. to 400° C. is usually carried out between the anodic oxidation and the application of the cathode layer in order to relieve stresses and heal defects in the dielectric layer. The application of the manganese dioxide layer is effected by impregnation with manganese nitrate solutions and subsequent pyrolysis at ≥300° C. with elimination of nitrogen oxides, with these steps being repeated a number of times until ideally the entire internal surface area of the anode body is covered. In these steps, the tantalum anodes are subjected to thermomechanical stress which usually leads to a certain reject rate.

Modern tantalum capacitors require not only a high capacity per unit volume, a low equivalent series resistance (ESR), and a low leakage current, but also a high stability towards external stresses. High mechanical stresses occur particularly during the production process during the preparation for the anodic oxidation (e.g., welding of the anode wires onto metal frames) or during the later encapsulation in epoxy resin, and these can lead to failure of capacitors and reduce the process yield.

The tantalum wire present in the tantalum anodes has the sole purpose of providing an electric contact for the capacitor anode. For manufacturing reasons, e.g., to be able to weld the sintered tantalum bodies to the treatment struts for the anodic oxidation, the wire usually has to project at least 10 mm from the sintered tantalum body. Owing to the increasing miniaturization of electronic components and thus also of tantalum electrolytic capacitors, the mass ratio of tantalum powder to tantalum wire is increasingly shifted in the direction of the wire, i.e., the production of relatively small types of capacitors having dimensions of only about 2×1×1 mm requires only a few milligrams of powder but, depending on the wire diameter, a mass of tantalum wire which is a number of times thereof, i.e., the tantalum wire is increasingly becoming the cost-determining factor. To save costs, the manufacturers of such capacitors are therefore continuously making efforts to use ever thinner wires.

This increasingly results, however, in the problem that the tantalum wires lose a great deal of mechanical stability due to embrittlement during anode production or during the further manufacturing steps to produce the capacitor, i.e., they can no longer be bent without breaking. This bending strength is important, however, since the anodes are subjected to mechanical stresses as described above at a number of points in the capacitor production process. This embrittlement of the wires therefore has a tremendous influence on the costs of capacitor production since in the case of unsatisfactory mechanical stability of the wire, i.e., a bending strength which is too low, the entire batch must be downgraded. The importance of this is also indicated by the presence of standards such as the Japanese EIAJ RC-2361A in which a test method for metering the bending strength of the wire is described.

In the production of tantalum capacitors, it has been observed that the extent of wire embrittlement tends to increase when the specific surface area of the tantalum powders used is gradually increased in order to increase the capacity per unit volume of the capacitors. The embrittlement of the tantalum wires in anodes thus increases dramatically, for example, when, instead of powders having a specific surface area of 2 $m^2/g$, powders having a surface area of 3 $m^2/g$ and above are used for production of the wires. It has furthermore been observed that relatively thin tantalum wires having diameters of less than 0.3 mm become embrittled more quickly than thicker wires. It has also been observed that the embrittlement of the tantalum wires immediately after sintering is low (i.e., the wires have a high bending strength), but increases greatly after only a short time (some hours) after sintering of the sintered tantalum bodies, especially when the sintered bodies are stored under high atmospheric humidity. It has also been observed that, as a result of the abovementioned heat treatments during capacitor production, e.g., during the anodic oxidation or during heat treatment, the embrittlement of the tantalum wires increases even more or the bending strengths of the wires decrease. The embrittlement can be to such an extent that the tantalum wires of the sintered bodies or of the anodes can break off under the slightest shock even a short time after sintering or anodic oxidation. The effect of embrittlement is worst at the place where the wire enters the sintered body or the anode since the greatest forces act here when bending occurs.

It is known that the earth-acid metals tantalum and niobium can be embrittled by reaction with various gases and vapors at elevated temperature (e.g., 300° C.) even after only a short time. It is also known that embrittlement of the wires can occur as a result of oxygen diffusion during the sintering of relatively fine tantalum powders having oxygen contents of greater than 1600 ppm and when using high sintering temperatures. In order to prevent this, the use of tantalum wires containing dopants, e.g., doping with 10-1000 ppm of rare earths (U.S. Pat. No. 3,268,328), with 10-1000 ppm of yttrium (U.S. Pat. No. 3,497,402), with 50-700 ppm of silicon (U.S. Pat. No. 4,235,629), or with a combination of 50-1000 ppm of silicon and 50-1000 ppm of finely divided metal oxides, has been proposed. The use of these wires brings no advantage, however, over undoped wire in the present case.

It is also known that tantalum can be significantly embrittled by hydrogen in very low concentrations of, for example, a few hundred ppm, even at room temperature since the diffusion rate of hydrogen atoms is significantly higher compared to oxygen or nitrogen. To increase the resistance of tantalum to hydrogen embrittlement, it has been proposed that tantalum be alloyed with elements of the platinum group (WO 2008/134439). These alloys have not, however, become established in the production of tantalum capacitors for cost reasons.

The precise mechanism of the above-described embrittlement of the tantalum wires after production of the sintered bodies or of the anodes or the further processing steps to the capacitor is unknown. Without wishing to be tied to a theory, it is assumed that the embrittlement in these cases occurs as a result of hydrogen which is formed by a reaction of the sintered tantalum bodies or anodes with atmospheric moisture (during storage) or water (e.g., when the sintered bodies are dipped into the electrolyte for anodic oxidation) according to the equation $2\ Ta + 5\ H_2O \rightarrow Ta_2O_5 + 5\ H_2$.

SUMMARY

An aspect of the present invention was to provide a process which does not have the abovementioned disadvantages, which allows for the inexpensive production of tantalum anodes for electrolytic capacitors, which have a high wire bending strength, and which is stable over the long term.

In an embodiment, the present invention provides a process for producing an anode for an electrolytic capacitor which includes pressing a tantalum powder around a tantalum wire, a tantalum ribbon, or a tantalum sheet to form a pressed body. The pressed body is sintered to form a porous sintered body. The porous sintered body is cooled to form a cooled porous sintered body. The cooled porous sintered body is treated with at least one oxidant comprising at least one of a gaseous oxidant and a liquid oxidant to form a treated sintered body. The treated sintered body is anodically oxidized in an electrolyte to form a dielectric layer.

DETAILED DESCRIPTION

It has now surprisingly been found that the mechanical stability and wire bending strength of tantalum wires in tantalum anodes can be durably stabilized for the production of electrolytic capacitors when the sintered tantalum bodies are ideally treated immediately, for example, not more than 15 minutes after sintering, with an oxidant which can provide active oxygen.

The present invention accordingly provides a process for producing an anode for electrolytic capacitors, wherein the process comprises the following steps:

a) pressing of a tantalum powder around a tantalum wire or a tantalum ribbon or a tantalum sheet to form a pressed body;

b) sintering of the pressed body to form a porous sintered body, c) cooling of the sintered body;

d) treatment of the porous sintered body with one or more gaseous or liquid oxidant(s); and e) anodic oxidation of the treated sintered body in an electrolyte to form a dielectric layer.

Such a sintered body can, for example, comprise an anode body. Without wishing to be tied to the theory, it is assumed that the liquid or gaseous oxidant heals defects in the passive layer on the surface of the sintered tantalum body and thus prevents the formation of hydrogen by dissociation of water (atmospheric moisture), which hydrogen would embrittle the tantalum wire. This is apparent in a high, stable wire bending strength which does not decrease significantly even after storage of the sintered bodies or anodes at high atmospheric humidity for days or in the further processing of the sintered bodies or anodes to produce capacitors.

The process of the present invention leads to a reduction in the wire embrittlement or to stabilization of the mechanical strength of the tantalum wires and can be tested by measurement of the wire bending strength on sintered tantalum bodies or anodes. For this purpose, an apparatus corresponding to the Japanese standard EIAJ RC-2361 A is used and the anodes are tested in accordance therewith.

In step a) of the process of the present invention, a tantalum powder is pressed around a tantalum wire or a tantalum ribbon or a tantalum sheet in order to form a pressed body. Tantalum ribbons usually have an average thickness of from 0.01 mm to 1 mm, a width of not more than 20 mm and a length to width ratio of greater than 4:1. Sheets usually have, at the same thickness and any width, a length to width ratio of less than 4:1. For this purpose, it is generally possible to use tantalum powders of any charge class and having any specific surface area (determined by BET). The process of the present invention can, for example, be carried out using tantalum powders having a specific surface area of greater than 1 m$^2$/g corresponding to a charge of capacitor anodes produced therefrom of greater than 50 000 µF V/g, for example, a specific surface area determined in accordance with ASTM D 3663 of greater than 2 m$^2$/g corresponding to a charge of capacitor anodes produced therefrom of greater than 100 000 µF V/g, for example, a specific surface area determined in accordance with ASTM D 3663 of greater than 3 m$^2$/g corresponding to a charge of capacitor anodes produced therefrom of greater than 150 000 µF V/g, and, for example, a specific surface area determined in accordance with ASTM D 3663 of greater than 4 m$^2$/g corresponding to a charge of capacitor anodes produced therefrom of greater than 200 000 µF V/g.

The tantalum powders can consist of particles or of agglomerates of primary particles which can have any desired shape, e.g., flake-shaped, angular, spherical, nodular or mixtures or modifications thereof. The size of the agglomerates (determined by sieve analysis) is usually less than 1000 µm, for example, less than 500 µm, for example, less than 300 µm, and, for example, less than 200 µm. The size (weight average diameter) of the primary particles (determined by imaging processes such as scanning electron microscopy SEM) is usually in the range from 10 µm to 0.01 µm, for example, from 5 µm to 0.01 µm, for example, from 1 µm to 0.01 µm, and, for example, from 0.5 µm to 0.01 µm.

It is possible to use tantalum powders having any bulk density (method of Scott, ASTM B329). Use can, for example, be made of tantalum powders having a bulk density in the range from 0.1 to 10.0 g/cm$^3$, for example, from 0.5 to 5.0 g/cm$^3$, and, for example, from 1.0 to 3.0 g/cm$^3$.

According to the present invention, other constituents can be added to the tantalum powder. For example, the powders can be mixed with a pressing aid so that the particles adhere to one another sufficiently well when pressed around the wire or the ribbon or the metal sheet in order to produce the pressed body. Suitable pressing aids are, for example, camphor, polyethylene glycols (e.g. Carbowax™), polyesters (e.g. Glyptal™), stearic acid and other soapy fatty acids, polyvinyl alcohols or vegetable waxes and microwaxes (purified paraffins). The pressing aid can be dissolved in a solvent in order to achieve better distribution in the powder. Solvents which may be mentioned by way of example are water, alcohols, ethers and others. Usual concentrations of the pressing aids are in the range from 0.1 to 10% by weight, for example, in the range from 0.1 to 5% by weight. The use of pressing aids is not, however, absolutely necessary for the present invention.

The wire or ribbon or metal sheet used in the process of the present invention can consist of pure tantalum metal or comprise essentially tantalum, but can also contain dopings of one or more elements, for example, selected from the group consisting of Si, Y, C, Rh, Pd, Pt, W, Nb, Mo, La, Ce, Nd, The or others.

The tantalum wire or the tantalum ribbon or the tantalum sheet can, for example, comprise at least 95% by weight, for example, at least 96% by weight, for example, at least 97% by weight, and, for example, at least 99% by weight, of tantalum, with the proportions by weight indicated being based on the total weight of the wire or the ribbon or the sheet.

It is possible to use tantalum wires having any diameters. Use can, for example, be made of those having an arithmetic mean diameter of ≤0.5 mm, for example, ≤0.3 mm, and, for example, ≤0.2 mm.

In an embodiment of the process of the present invention, the tantalum wire can, for example, have an arithmetic mean diameter of from 0.08 mm to 0.5 mm, for example, from 0.1 to 0.3 mm, and, for example, from 0.12 to 0.2 mm.

The production of the pressed body can be carried out using all types of pressing molds and processes with which a person skilled in the art is familiar. After pressing, the pressing aids can be removed by heating the pressed body at temperatures in the range 100° C. to 500° C. under reduced pressure for from a number of minutes to hours. As an alternative, the pressing aids can be removed by leaching with aqueous solutions, as is described, for example, in U.S. Pat. No. 5,470,525.

In step b) of the process of the present invention, the pressed bodies produced in step a) are sintered. The sintering enables porous sintered bodies to be obtained.

The temperature during sintering can, for example, be in the range 1000° C. 2000° C., for example, in the range 1100° C. to 1600° C. and, for example, in the range 1200° C. to 1400° C. Sintering can, for example, be carried out in a high vacuum (pressure less than $10^{-3}$ mbar), but can alternatively also be carried out under noble gases such as helium or argon. The hold time (time at $T_{max}$) during sintering is in the range from one minute to one hour. During sintering, the anode body shrinks by up to 25% by volume since bonds between the particles grow and grain growth occurs.

The pressing and sintering conditions employed in step a) and b) of the process of the present invention for producing the sintered body are chosen so that the sintered bodies obtained have a porosity determined by mercury porosimetry in the range 20-70%, for example, 30-60% and, for example, 40-60%.

In step c) of the process of the present invention, sintered bodies obtained by sintering in step b) are cooled. Cooling can, for example, be carried out under reduced pressure and/or in the presence of a protective gas atmosphere. Argon and/or helium can, for example, be used as protective gases. If cooling is carried out under reduced pressure, a pressure below 1 mbar, for example, below $10^{-4}$ bar, for example, below $10^{-5}$ bar, and, for example, below $10^{-6}$ bar can be used.

Cooling is usually carried out to ambient temperature, i.e., to about 15° C. to 30° C., for example, 25° C. Cooling can, however, also be carried out to the temperature range selected for the subsequent treatment of the porous anode body with the oxidant in step d) of the process of the present invention.

In step d) of the process of the present invention, the treatment with an oxidant is carried out. The oxidant used in step d) of the process of the present invention is liquid or gaseous. The oxidant should firstly be able to provide atomic oxygen in a sufficient amount and, secondly, not contaminate the sintered tantalum bodies, i.e., the decomposition products must not react with the tantalum and must be easy to remove since they could otherwise be incorporated into the dielectric layer during the anodic oxidation and can have adverse effects on the leakage current of the capacitor. Suitable oxidants can, for example, be dry oxygen, ozone, peroxides, perborates, percarbonates, periodates, permanganates, peracids such as periodic acid, or peroxodisulphuric acid.

For the abovementioned reasons, hydrogen peroxide solutions, oxygen and ozone are considered to be particularly advantageous. Hydrogen peroxide and in particular its aqueous solutions can, for example, be used because of the relatively simple handleability and/or processability or for cost reasons.

The treatment of the sintered bodies in step d) is advantageously carried out at a suitable temperature and for a sufficient time. The temperature can, for example, be in the range from 0° C. to 300° C., for example, from 10° C. to 200° C. and, for example, in the range 20° C. to 100° C. The treatment time can be in the range from some minutes to many days, for example, treatment times of from 1 minute to 1000 hours, for example, from 0.1 hour to 500 hours, for example, from 0.5 hour to 100 hours and, for example, from 1 hour to 24 hours. When dry oxygen is used as the oxidant, it has been found that the treatment can advantageously be carried out at temperatures above 60° C., for example, from 70° C. to 200° C., so as to achieve a long-lasting effect.

The treatment, for example, with an aqueous hydrogen peroxide solution, can, for example, be carried out for at least one hour.

When liquid/dissolved oxidants are used, the treatment is carried out by means of any known technique such as dipping, printing, spraying, powder coating, etc. The concentration of oxidant in the solutions comprising solvent and oxidant can, for example, be in the range from 0.001 M to 15 M, for example, in the range from 0.001 M to 8 M, for example, in the range from 0.01 M to 5 M and, for example, in the range from 0.01 M to 2 M.

In an embodiment of the present invention, the oxidant can, for example, be present in the form of an aqueous hydrogen peroxide solution, for example, in a concentration of from 0.1 to 50% by weight, for example, from 1 to 30% by weight, for example, from 1 to 10% by weight and, for example, from 1 to 5% by weight, of hydrogen peroxide, where the proportions by weight indicated are based on the total weight of the aqueous hydrogen peroxide solution.

Solvents can, for example, be used which, firstly, are able to dissolve the desired concentration of oxidant without decomposition and, secondly, themselves do not react with the sintered tantalum bodies or tantalum body. Suitable solvents are, for example, water, alcohols, ethers, triglycerides, ketones, esters, amides, nitriles, etc. Aqueous solutions can, for example, be used.

After treatment of the sintered tantalum bodies with the oxidant, these can, if desired, be washed with solvents such as water or alcohols, for example, methanol, ethanol or propanol, in order to remove residues of the constituents. They can then optionally be dried, for example, at temperatures of 50° C. to 200° C.

In step e) of the process of the present invention, the sintered bodies which have been treated in step d) are anodically oxidized. The sintered bodies can, for example, be anodically oxidized by dipping into an aqueous or nonaqueous electrolyte. The electrolyte is electrically conductive and can have a conductivity of 1-100 mS/cm, for example, 1-50 mS/cm and, for example, 1-30 mS/cm, in each case measured at 25° C. As electrolytes, use is typically made of inorganic acids (e.g., HCl, $H_3PO_4$, $HNO_3$, $H_2SO_4$, $H_3BO_3$, etc.) or organic acids (e.g., acetic acid, malonic acid, maleic acid, succinic acid, etc.) or others. In an embodiment of the present invention, one or more of the abovementioned oxidants can, for example, be added in the abovementioned concentrations to the electrolyte. An aqueous solution of hydrogen peroxide can, for example, be used. In this way, additional stabilization of the bending strength of the wires in the tantalum anodes can be achieved.

In an embodiment of the present invention, one or more oxidants can, for example, be added to the electrolyte in step e), and step d) can thus optionally be omitted. The electrolyte can, for example, contain hydrogen peroxide.

In an embodiment, the present invention provides an anode or an anode body which can be obtained by the process of the present invention.

In an embodiment, the present invention provides an anode which is suitable for use as tantalum electrolytic capacitors, wherein the anode contains an embedded and sintered-in tantalum metal wire and the ratio Wa/Ws formed from the wire embrittlement number measured after formation (anodic oxidation) of the sintered body (Wa) and the wire embrittlement number measured immediately after sintering and cooling to 20° C. (Ws) of the pressed body is in the range from 0.2 to 1, with the wire embrittlement number being measured in each case in accordance with the Japanese standard EIAJ RC-2361 A.

Wa is the wire embrittlement number measured after three (3) hours of anodic oxidation of the sintered body which has been anodically oxidized by dipping into a dilute phosphoric acid solution heated to 85° C. and having a conductivity of 4300 µS and at a current limited to 150 mA up to a voltage of 20 V. After the current decreases, the voltage is maintained for another three (3) hours.

Ws is the wire embrittlement number measured immediately after, but at the latest 15 minutes after, sintering of the pressed body and cooling to room temperature (20° C.).

In the case of the anodes of the present invention, the ratio Wa/Ws is ideally in the range from 0.2 to 1, for example, from 0.4 to 1.

The anodes of the present invention can, for example, have a wire which has an arithmetic mean diameter of ≤0.5 mm, for example, ≤0.3 mm and, for example, ≤0.2 mm.

In an embodiment of the present invention, the anodes of the present invention have a wire which can, for example, have an arithmetic mean diameter of from 0.08 mm to 0.5 mm, for example, from 0.1 to 0.3 mm and, for example, from 0.12 to 0.2 mm.

The tantalum wire or the tantalum ribbon or the tantalum sheet of the anodes of the present invention can in particular comprise at least 95% by weight, for example, at least 96% by weight, for example, at least 98% by weight, of tantalum, where the proportion by weight indicated is based on the total weight of the wire, the ribbon or the metal sheet.

In an embodiment of the present invention, the anodes can, for example, have a density of 3.5-9.0 g/cm³, for example, from 4.0 to 8.0 g/cm³ and, for example, from 4.5 to 6.5 g/cm³.

The size of the tantalum anodes for which the process described can be used is not limited. The tantalum anodes can, for example, be in the range below 10 cm³, for example, in the range below 5 cm³, and, for example, in the range below 1 cm³. The shape of the tantalum anode is typically cuboidal, but can also have other shapes such as droplet-shaped, cylindrical or arc-shaped. The anode can also have a grooved surface, for example, to increase the ratio of surface area to volume and thereby reduce the ESR.

The tantalum anodes of the present invention are highly suitable for producing electrolytic capacitors in a very high yield. These electrolytic capacitors of the present invention can be used as a component in electronic circuits, for example, as a smoothing capacitor (filter capacitor) or a suppressor capacitor (decoupling capacitor).

In an embodiment, the present invention also provides for the use of the anode of the present invention as a component in electronic circuits, for example, as a smoothing capacitor or a suppressor capacitor. The anodes of the present invention can, for example, be used to produce electrolytic capacitors.

In an embodiment, the present invention provides an electrolytic capacitor containing an anode according to the present invention.

In an embodiment, the present invention provides an electronic circuit containing an electrolytic capacitor according to the present invention.

The following examples serve to illustrate the present invention and are not to be interpreted as a restriction thereof.

EXAMPLES

Example 1

35 mg of a tantalum powder having a specific surface area determined in accordance with ASTM D 3663 of 3.5 m²/g were pressed around a tantalum wire to form a pressed body having a density of 6.5 g/cm³. The pressed body was cuboidal having the dimensions 2.1 mm×1.6 mm×1.6 mm. The average diameter of the tantalum wire was 0.19 mm. The pressed bodies were sintered at 1315° C. in a high vacuum for 20 minutes and then cooled in the furnace to room temperature (25° C.) under helium (specimen 1). The sintered bodies were then immediately, at the latest 15 minutes after sintering, stored in a 5% strength by weight aqueous solution of hydrogen peroxide for 1 hour and subsequently washed with water and dried at 100° C. After the treatment with hydrogen peroxide, part of the sintered bodies were stored in dilute phosphoric acid heated to 85° C. and having a conductivity of 4300 µS for 4 hours (specimen 3) and 24 hours (specimen 4). Another part of the sintered bodies was stored in a controlled atmosphere chamber at 20° C. and 50% relative atmospheric humidity for 24 hours (specimen 2). The sintered bodies from the controlled atmosphere chamber were subsequently dipped into a dilute phosphoric acid solution heated to 85° C. and having a conductivity of 4300 µS and anodically oxidized at a current limited to 150 mA to a voltage of 20 V. After the current decreases, the voltage was maintained for another 3 hours, and the wire embrittlement number was measured after 1 hour (specimen 5) and 3 hours (specimen 6).

For each example, the wire embrittlement number was measured on a number of different specimens:

Specimen 1: Immediately after sintering.
Specimen 2: After storage for 24 hours in a controlled atmosphere chamber.

Specimen 3: After storage for 4 hours in dilute phosphoric acid solution heated to 85° C.

Specimen 4: After storage for 24 hours in dilute phosphoric acid solution heated to 85° C.

Specimen 5: After storage for 24 hours in a controlled atmospheric chamber and anodic oxidation for 1 hour.

Specimen 6: After storage for 24 hours in a controlled atmospheric chamber and anodic oxidation for 3 hours.

Example 2

A tantalum powder which is different from that in Example 1 and has a specific surface area determined in accordance with ASTM D 3663 of 4.1 m$^2$/g and has a higher tendency to undergo wire embrittlement was examined in a manner corresponding to Example 1.

Example 3

Procedure corresponding to Example 1, but the concentration of the hydrogen peroxide solution was 1%.

Example 4

Procedure corresponding to Example 2, but the concentration of the hydrogen peroxide solution was 1%.

Example 5

Comparative Example 1

Procedure corresponding to Example 1, but the treatment with hydrogen peroxide was omitted for all parts.

Example 6

Comparative Example 2

Procedure corresponding to Example 2, but the treatment with hydrogen peroxide was omitted for all parts.

Example 7

Procedure corresponding to Example 1, but the sintered bodies were treated with dried oxygen for one hour after sintering. This treatment took place at 90° C. The treatment with hydrogen peroxide was also omitted.

Example 8

Procedure corresponding to Example 2, but the sintered bodies were treated with dried oxygen for one hour after sintering. This treatment took place at 90° C. The treatment with hydrogen peroxide was also omitted.

Example 9

Procedure corresponding to Example 1, but the treatment with hydrogen peroxide was omitted for all parts. The electrolyte for the anodic oxidation contained 5% of hydrogen peroxide and the amount of phosphoric acid necessary to achieve a conductivity of 4300 µS at 85° C.

Example 10

Procedure corresponding to Example 2, but the treatment with hydrogen peroxide as omitted for all parts. The electrolyte for the anodic oxidation contained 5% of hydrogen peroxide and the amount of phosphoric acid necessary to achieve a conductivity of 4300 µS at 85° C.

Example 11

Procedure corresponding to Example 10, but the sintered bodies were not stored in the controlled atmosphere chamber before the anodic oxidation, but were instead immediately anodically oxidized within 5 hours after sintering.

Example 12

Procedure corresponding to Example 1, but with a density of the pressed body of 5.5 g/cm$^3$.

Example 13

Procedure corresponding to Example 2, but with a density of the pressed body of 5.5 g/cm$^3$.

Example 14

Comparative Example 3

Procedure corresponding to Example 5, but with a density of the pressed body of 5.5 g/cm$^3$.

Example 15

Comparative Example 4

Procedure corresponding to Example 6, but with a density of the pressed body of 5.5 g/cm$^3$.

Example 16

Procedure corresponding to Example 7, but with a density of the pressed body of 5.5 g/cm$^3$.

Example 17

Procedure corresponding to Example 8, but with a density of the pressed body of 5.5 g/cm$^3$.

Example 18

Procedure corresponding to Example 9, but with a density of the pressed body of 5.5 g/cm$^3$.

Example 19

Procedure corresponding to Example 10, but with a density of the pressed body of 5.5 g/cm$^3$.

The wire embrittlement numbers measured for the individual examples and calculated ratios Wa/Ws are shown in Table 1.

Wa is the wire embrittlement number measured after 3 hours of anodic oxidation of the sintered body which was anodically oxidized by dipping into a dilute phosphoric acid solution heated to 85° C. and having a conductivity of 4300 µS at a current limited to 150 mA to a voltage of 20 V. After the current decreases, the voltage was maintained for another 3 hours.

Ws is the wire embrittlement number measured immediately after, but at the latest 15 minutes after, sintering of the pressed body and cooling to room temperature (20° C.).

The wire embrittlement number was determined in accordance with the Japanese standard EIAJ RC-2361A, as follows:

a) Fixing of the sintered body or the anode so that the wire is at right angles to the axis of rotation and the point at which the wire exits from the sintered body or anode is located on the axis of rotation.
b) Attachment of a 50 g weight to the end of the wire.
c) Rotation of the sintered body or the anode by 90° and rotation back to the starting position. This movement increases the wire embrittlement number by 1.
d) Rotation of the sintered body or the anode by 90° in the opposite direction and rotation back to the starting position. The wire embrittlement number is increased by 1.
e) Steps c) and d) are repeated until the wire breaks.

The higher the wire embrittlement number, the less brittle is the wire of the sintered body or the anode.

TABLE 1

| Example | Specimen | | | | | | Wa/Ws |
|---|---|---|---|---|---|---|---|
| | 1 | 2 | 3 | 4 | 5 | 6 | |
| 1 | 37 | 35 | 36 | 35 | 27 | 21 | 0.57 |
| 2 | 35 | 34 | 34 | 35 | 25 | 20 | 0.57 |
| 3 | 36 | 34 | 35 | 33 | 28 | 20 | 0.56 |
| 4 | 35 | 34 | 34 | 32 | 24 | 19 | 0.54 |
| 5 (Comp. 1) | 37 | 25 | <1* | <1* | 7 | 5 | 0.14 |
| 6 (Comp. 2) | 35 | 5 | <1* | <1* | 2 | <1* | <0.03 |
| 7 | 37 | 25 | <1* | <1* | 23 | 18 | 0.49 |
| 8 | 34 | 23 | <1* | <1* | 20 | 16 | 0.47 |
| 9 | 37 | 26 | <1* | <1* | 18 | 15 | 0.41 |
| 10 | 35 | 6 | <1* | <1* | 6 | 5 | 0.14 |
| 11 | 34 | — | <1* | <1* | 17 | 14 | 0.41 |
| 12 | 36 | 35 | 34 | 35 | 30 | 24 | 0.67 |
| 13 | 35 | 33 | 32 | 33 | 27 | 23 | 0.66 |
| 14 (Comp. 3) | 35 | 23 | <1* | <1* | 8 | 6 | 0.17 |
| 15 (Comp. 4) | 33 | 4 | <1* | <1* | 3 | <1* | <0.03 |
| 16 | 33 | 27 | <1* | <1* | 21 | 19 | 0.58 |
| 17 | 34 | 24 | <1* | <1* | 20 | 15 | 0.44 |
| 18 | 35 | 27 | <1* | <1* | 19 | 13 | 0.37 |
| 19 | 33 | 7 | <1* | <1* | 18 | 14 | 0.42 |

*According to the Japanese standard, a bending counts only when the wire of the sintered body has been bent by 90° in one direction and has been bent back again.

The present invention is not limited to embodiments described herein; reference should be had to the appended claims.

What is claimed is:

1. A process for producing an anode for an electrolytic capacitor, the process comprising:
   a) pressing a tantalum powder around a tantalum wire, a tantalum ribbon, or a tantalum sheet to form a pressed body;
   b) sintering the pressed body to form a porous sintered body;
   c) cooling the porous sintered body to form a cooled porous sintered body;
   d) treating the cooled porous sintered body with at least one oxidant comprising at least one of a gaseous oxidant and a liquid oxidant to form a treated sintered body; and
   e) anodically oxidizing the treated sintered body in an electrolyte to form a dielectric layer,
   wherein, the treating of the cooled porous sintered body with the at least one oxidant to form a treated sintered body is performed directly after the cooled porous sintered body is formed.

2. The process as recited in claim 1, wherein the electrolyte in step e) comprises at least one oxidant.

3. The process as recited in claim 1, wherein the at least one of the at least one oxidant in step d) and the electrolyte in step e) comprises an aqueous hydrogen peroxide solution.

4. The process as recited in claim 3, wherein the aqueous hydrogen peroxide solution is provided at a concentration of from 0.1 to 50 wt.-%, the wt.-% being based on a total weight of the aqueous hydrogen peroxide solution.

5. The process as recited in claim 1, wherein the treatment of the cooled porous sintered body in step d) is carried out for at least one hour.

6. The process as recited in claim 1, wherein, after treating the cooled porous sintered body with the at least one oxidant to form a treated sintered body in step d), the process further comprises:
   washing the treated sintered body with water; and
   drying the treated sintered body.

7. An anode obtainable by the process recited in claim 1.

8. The anode as recited in claim 7, wherein the anode comprises a tantalum wire which is embedded and sintered-in, wherein a range of a ratio Wa/Ws, formed from a wire embrittlement number measured after formation of the porous sintered body (Wa), and a wire embrittlement number measured immediately after sintering and cooling to 20° C. (Ws) to form the cooled porous sintered body, is from 0.2 to 1, each of the wire embrittlement numbers being measured in accordance with a Japanese Standard EIAJ RC-2361 A.

9. The anode as recited in claim 8, wherein the range of the ratio Wa/Ws is from 0.4 to 1.

10. The anode as recited in claim 7, wherein the anode comprises a tantalum wire comprising an arithmetic mean diameter of ≤0.5 mm.

11. The anode as recited in claim 7, wherein the anode comprises a tantalum wire comprises a tantalum wire comprising an arithmetic mean diameter of from 0.08 mm to 0.5 mm.

12. The anode as recited in claim 7, wherein the anode comprises a tantalum wire comprises a tantalum wire comprising at least 95 wt.-% of tantalum, the wt.-% being based on a total weight of the tantalum wire.

13. The anode as recited in claim 7, wherein the anode has a density of 3.5 to 9.0 g/cm$^3$.

14. An electrolytic capacitor comprising the anode as recited in claim 7.

15. An electronic circuit comprising the electrolytic capacitor as recited in claim 14.

16. A method of using an anode obtainable by the process recited in claim 1 to produce an electrolytic capacitor, the method comprising:
   providing an anode by the process recited in claim 1; and
   using the anode to produce an electrolytic capacitor.

17. The method of using as recited in claim 16, wherein the electrolytic capacitor is at least one of a smoothing capacitor and a suppressor capacitor.

18. An anode suitable for use as a tantalum electrolytic capacitor, the anode comprising a tantalum wire which is embedded and sintered-in, wherein a range of a ratio Wa/Ws, formed from a wire embrittlement number measured after formation of a porous sintered body (Wa), and a wire embrittlement number measured immediately after a sintering and a cooling to 20° C. (Ws) to form a cooled porous sintered body, is from 0.2 to 1, each of the wire embrittlement numbers being measured in accordance with a Japanese Standard EIAJ RC-2361 A.

19. The anode as recited in claim 18, wherein the range of the ratio Wa/Ws is from 0.4 to 1.

20. The anode as recited in claim 18, wherein the tantalum wire comprises an arithmetic mean diameter of ≤0.5 mm.

21. The anode as recited in claim 18, wherein the tantalum wire comprises an arithmetic mean diameter of from 0.08 mm to 0.5 mm.

22. The anode as recited in claim 18, wherein the tantalum wire comprises at least 95 wt.-% of tantalum, the wt.-% being based on a total weight of the tantalum wire.

23. The anode as recited in claim 18, wherein the anode has a density of 3.5 to 9.0 g/cm$^3$.

24. An electrolytic capacitor comprising the anode as recited in claim 18.

25. An electronic circuit comprising the electrolytic capacitor as recited in claim 24.

26. A method of using the anode as recited in claim 18 to produce an electrolytic capacitor, the method comprising:
   providing an anode as recited in claim 18; and
   using the anode to produce an electrolytic capacitor.

27. The method of using as recited in claim 26, wherein the electrolytic capacitor is at least one of a smoothing capacitor and a suppressor capacitor.

* * * * *